United States Patent [19]

Ikeoka et al.

[11] Patent Number: 4,607,732

[45] Date of Patent: Aug. 26, 1986

[54] DRIVE MECHANISM FOR A MECHANICAL PRESS

[75] Inventors: Naoaki Ikeoka; Akihiko Nakano, both of Komatsu, Japan

[73] Assignee: Kabushiki Kaisha Komatsu Seisakusho, Tokyo, Japan

[21] Appl. No.: 463,969

[22] Filed: Feb. 4, 1983

[30] Foreign Application Priority Data

Feb. 5, 1982 [JP] Japan ............................ 57-14046[U]

[51] Int. Cl.[4] ......................... B30B 1/00; F16D 67/00

[52] U.S. Cl. ................................. 192/12 R; 192/144; 100/282

[58] Field of Search ............. 100/282; 192/12 R, 144, 192/17 R, 143, 145, 146, 147

[56] References Cited

U.S. PATENT DOCUMENTS 2,771,790 11/1956 Munschauer ........................ 100/282

3,779,155 12/1973 Ohno .................................. 100/282

*Primary Examiner*—Rodney H. Bonck

*Assistant Examiner*—Richard M. Lorence

*Attorney, Agent, or Firm*—Frost & Jacobs

[57] ABSTRACT

In a crank or eccentric press a main shaft is rotatably supported over a reciprocating ram or rams. Nonrotatably mounted on one end of the main shaft, a drive gear meshes directly with a drive pinion on a drive shaft which partly projects out of one side of the drive housing and which has a driving flywheel mounted on the projecting end. The other end of the main shaft is geared to a brake shaft having a portion projecting out of the other side of the drive housing and having a brake mounted thereon. Within the drive housing one or more axially spaced pairs of main pinions are fixedly mounted on the main shaft. Each pair of main pinions are in mesh with two pairs of main gears rotatable about fixed axes. Each main gear has a crankpin projecting therefrom and operatively coupled to the ram. This drive system makes possible the reduction of the height of the press.

1 Claim, 7 Drawing Figures

DRIVE MECHANISM FOR A MECHANICAL PRESS

BACKGROUND OF THE INVENTION

Our invention relates to a press, to a mechanical press, and in particular to that of the crank or eccentric variety. Still more particularly the invention pertains to an improved drive mechanism for such a mechanical press.

In the conventional crank or eccentric press (shown in FIGS. 1 and 2 of the drawings attached hereto) which we believe is closest to that of our invention, a main shaft is rotatably supported within a crown or drive housing supported above a slide or ram by uprights. The main shaft has mounted thereon a pair of main pinions each meshing with a pair of main gears. A crankpin or eccentric cam projecting from each main gear is coupled to the ram to cause same to move up and down in response to the rotation of the main shaft. For revolving the main shaft the known press has a drive shaft rotatably supported over the crown. The drive shaft has a driving flywheel, complete with a clutch, and a brake on its opposite ends. The rotation of the drive shaft is transmitted to the main shaft via a drive pinion on the drive shaft, an idler gear, and a driven gear on the main shaft.

The above conventional drive system is subject to the drawback that, disposed over the press crown, the flywheel, clutch, brake, etc., add considerably to the height of the press. This drawback becomes all the more objectionable in the case of large, heavy-duty presses or those having long slide strokes or slide adjustment strokes. For, if too high, a press may not be installed in a plant whose ceiling or roof is not sufficiently high. Even if there is some headroom above the installed press, moreover, it may interfere with overhead cranes or the like. The height of presses should therefore be reduced as far as possible.

SUMMARY OF THE INVENTION

Our invention seeks to reduce to an absolute minimum the height of a mechanical press of the class defined.

For the attainment of the above and other objects, our invention provides an improved drive mechanism for a mechanical press comprising a main shaft rotatably supported within a fixed drive housing over the press ram or slide. On one end of the main shaft a drive gear is fixedly mounted and meshes with a drive pinion fixedly mounted on a drive shaft which is laid parallel to the main shaft. Also fixedly mounted on the drive shaft is a flywheel, complete with a clutch, for imparting rotation to the main shaft via the intermeshing drive pinion and drive gear. The flywheel with the clutch is disposed on one side of the drive housing. Disposed on the other side of the drive housing are braking means acting on the other end of the main shaft. At least one pair of main pinions are fixedly mounted on the main shaft midway between its ends and are engaged with at least one pair of main gears rotatable about a fixed axis within the drive housing. Also included are means for translating the rotation of the main gears into the up-and-down motion of the ram or slide.

Attention should be paid to the fact that, mounted on one end of the main shaft, the drive gear meshes directly with the drive pinion on the drive shaft. This arrangement makes it possible to position the drive pinion, flywheel and clutch on one side of the drive housing, and the braking means on the other side. Heretofore mounted on top of the crown or drive housing, these components of the drive mechanism can be placed below the top plane of the drive housing, with the consequent drastic reduction in the press height. Some of the components may project upwardly of the drive housing as some press constructions demand, but only to such an extent that the press height will nevertheless be far less than heretofore.

According to a further feature of our invention the braking means comprise a brake on a brake shaft which is coupled to the main shaft via two intermeshing gears. Thus the clutch and the brake are mounted on separate shafts independently geared to the main shaft. This feature makes it possible to adjustably vary the brake capacity by changing the ratio of the gears connecting the brake shaft to the main shaft.

The above and other features and advantages of our invention and the manner of attaining them will become more apparent, and the invention itself will best be understood, from a study of the following description and appended claims, taken together with the attached drawings.

DETAILED DESCRIPTION

Figure 1:
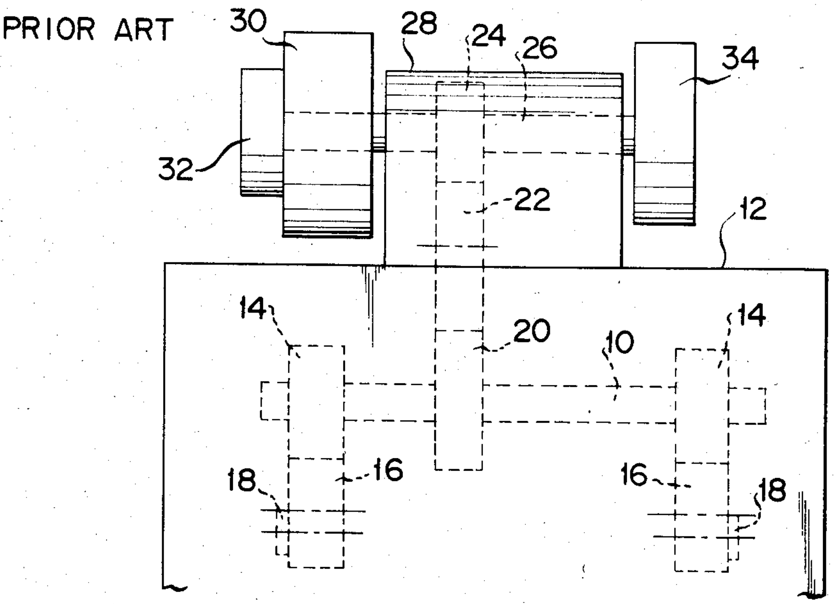
FIG. 1 PRIOR ART
FIG. 1 is a diagrammatic representation of a prior art drive mechanism for a crank or eccentric press bearing particular pertinency to our invention.
Figure 2:
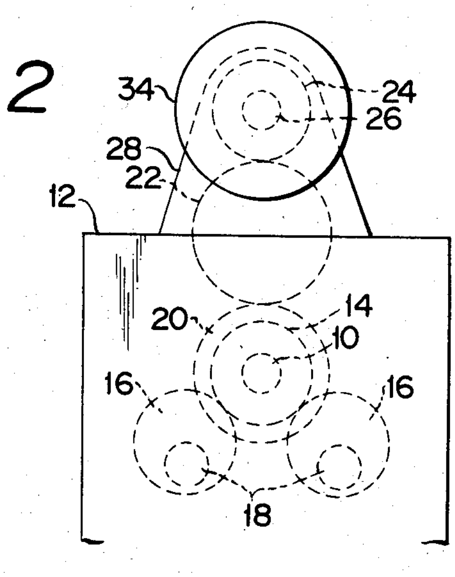
FIG. 2 PRIOR ART
FIG. 2 is also a diagrammatic representation of the prior art press drive mechanism, as seen from the right hand side of FIG. 1.

The noted conventional drive system of a crank or eccentric press will become apparent upon consideration of FIGS. 1 and 2. It comprises a main shaft 10 rotatably mounted within a crown 12. Fixedly mounted on the opposite ends of the main shaft 10, a pair of main pinions 14 mesh with two pairs of main gears 16. A crankpin or eccentric cam 18 projecting from each main gear 16 is operatively coupled to a ram or slide, not shown, to cause its up-and-down motion in response to the rotation of the main gears.

In order to cause the rotation of the main gears 16 the main shaft 10 has a driven gear 20 fixedly mounted thereon intermediate its ends. The driven gear 20 meshes with an idler gear 22, which in turn meshes with a drive pinion 24 on a drive shaft 26 rotatably supported within an upward extension 28 of the crown 12. The drive shaft 26 has its opposite ends projecting out of the upward crown extension 28. Mounted on one projecting end of the drive shaft 26 is a flywheel 30 having a clutch 32. A brake 34 is mounted on the other projecting end of the drive shaft 26.

As has been stated, the mounting of the drive shaft 26, together with the drive pinion 24, flywheel 30, clutch 32 and brake 34 thereon, on top of the crown 12 is objectionable by reason of the added height of the press. Our invention succeeds in drastically reducing the height of this type of mechanical press by providing an improved drive mechanism to be incorporated therein.

Figure 3:
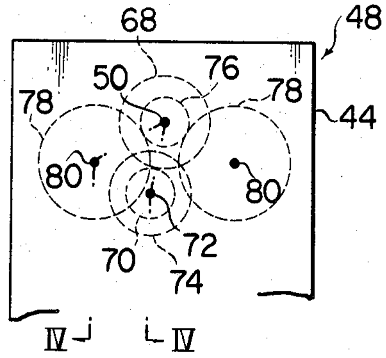
FIG. 3 is a diagrammatic side elevation of the press drive mechanism embodying the principles of our invention.
Figure 4:
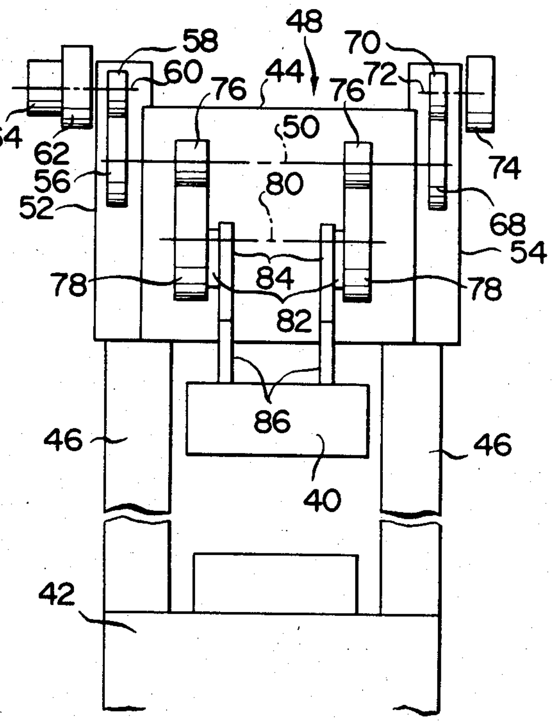
FIG. 4 is a diagrammatic, developed sectional view, partly shown broken away for simplicity, of the press drive mechanism, taken along the line IV—IV of FIG. 3, the drive mechanism being shown together with other pertinent parts of the press which is herein shown as a crank press.

FIGS. 3 and 4 illustrate, in its simplest form, the crank press including the improved drive mechanism of our invention. The press includes a ram or slide 40 movable up and down relative to a bed 42. Over the ram 40 a drive housing or crown 44 is immovably supported by uprights 46 for accommodating parts of the improved drive mechanism generally referenced 48. The drive mechanism 48 functions to impart the desired up-and-down motion to the ram 40.

The drive mechanism 48 includes a main shaft 50 rotatably supported within the drive housing 44. The opposite ends of this main shaft project out of the drive housing 44 into its lateral extensions 52 and 54. Fixedly mounted on one end of the main shaft 50, located in the left hand drive housing extension 52 as seen in FIG. 4, is a drive gear 56 which is in mesh with a drive pinion 58. This drive pinion is fixedly mounted on a drive shaft 60 rotatably supported in the drive housing extension 52 in parallel relation to the main shaft 50. Projecting out of the drive housing extension 52, one end of the drive shaft 60 has fixedly mounted thereon a flywheel 62 having a clutch 64. The flywheel is belt driven by a motor or other prime mover, not shown, to cause rotation of the main shaft 50 via the intermeshing drive gear 56 and drive pinion 58.

Firmly mounted on the other end of the main shaft 50, projecting into the right hand drive housing extension 54 as viewed in FIG. 4, is a gear 68 meshing with a pinion 70 held fast on a brake shaft 72. This brake shaft is rotatably supported in the drive housing extension 54 in parallel relation to the main shaft 50, with one of its ends projecting outwardly therefrom. A brake 74 is provided to this projecting end of the brake shaft 72.

Within the drive housing 44 a pair of main pinions 76 are fixedly mounted on the main shaft 50 intermediate its ends. The main pinions 76 mesh with one or more, two in the illustrated embodiment, pairs of main gears 78 rotatable about fixed axes 80. Each main gear 78 has a crankpin 82 projecting eccentrically therefrom. The crankpins 82 on all the main gears 78 are operatively coupled, via links 84 and connecting rods 86, to the ram 40. The links 84 and connecting rods 86 function in the known manner to translate the rotation of the main gears 78 into the up-and-down motion of the ram 40.

Thus, since the drive gear 56 on one end of the main shaft 50 meshes directly with the drive pinion 58, the flywheel 62 and clutch 64 can be disposed on one side of the drive housing 44, and the brake 74 on the other side of the drive housing. Consequently the press with the improved drive mechanism 48 of our invention is considerably less in height than the above described conventional press, as will be understood upon comparison of FIGS. 2 and 3 in particular.

Figure 5:
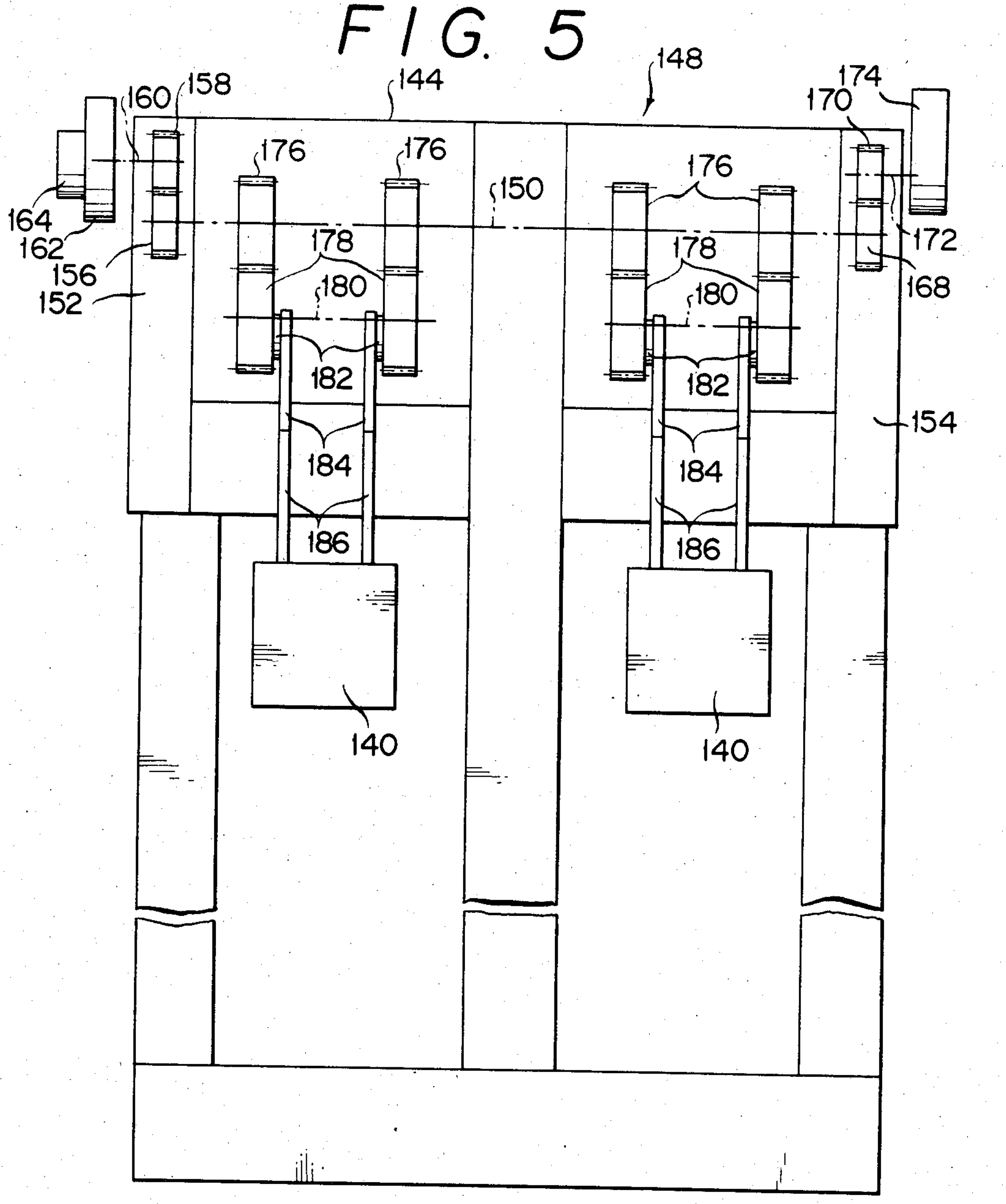
FIG. 5 is a view similar to FIG. 4 but showing a dual crank press incorporating two drive mechanisms each constructed as in FIGS. 3 and 4.
Figure 6:
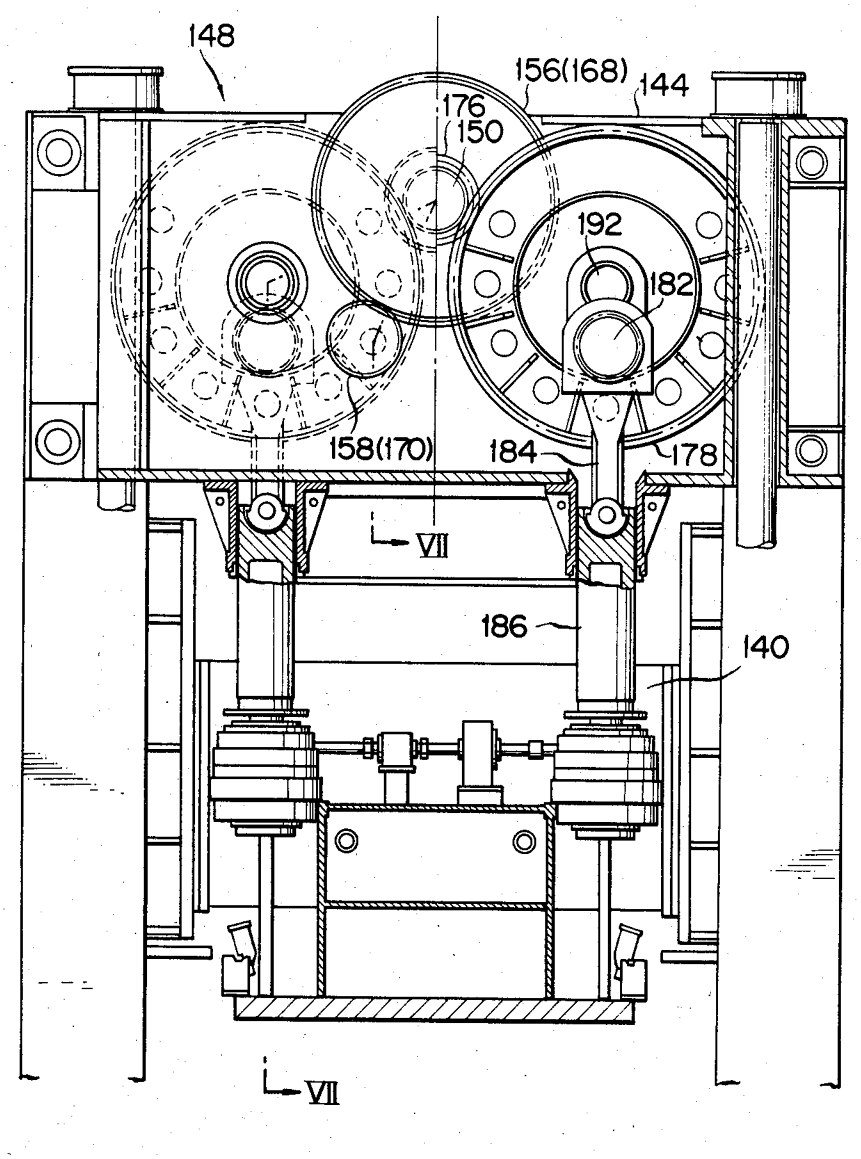
FIG. 6 is a fragmentary side elevation, partly in section, of a practical form of the dual crank press constructed in accordance with the teachings of FIG. 5.
Figure 7:
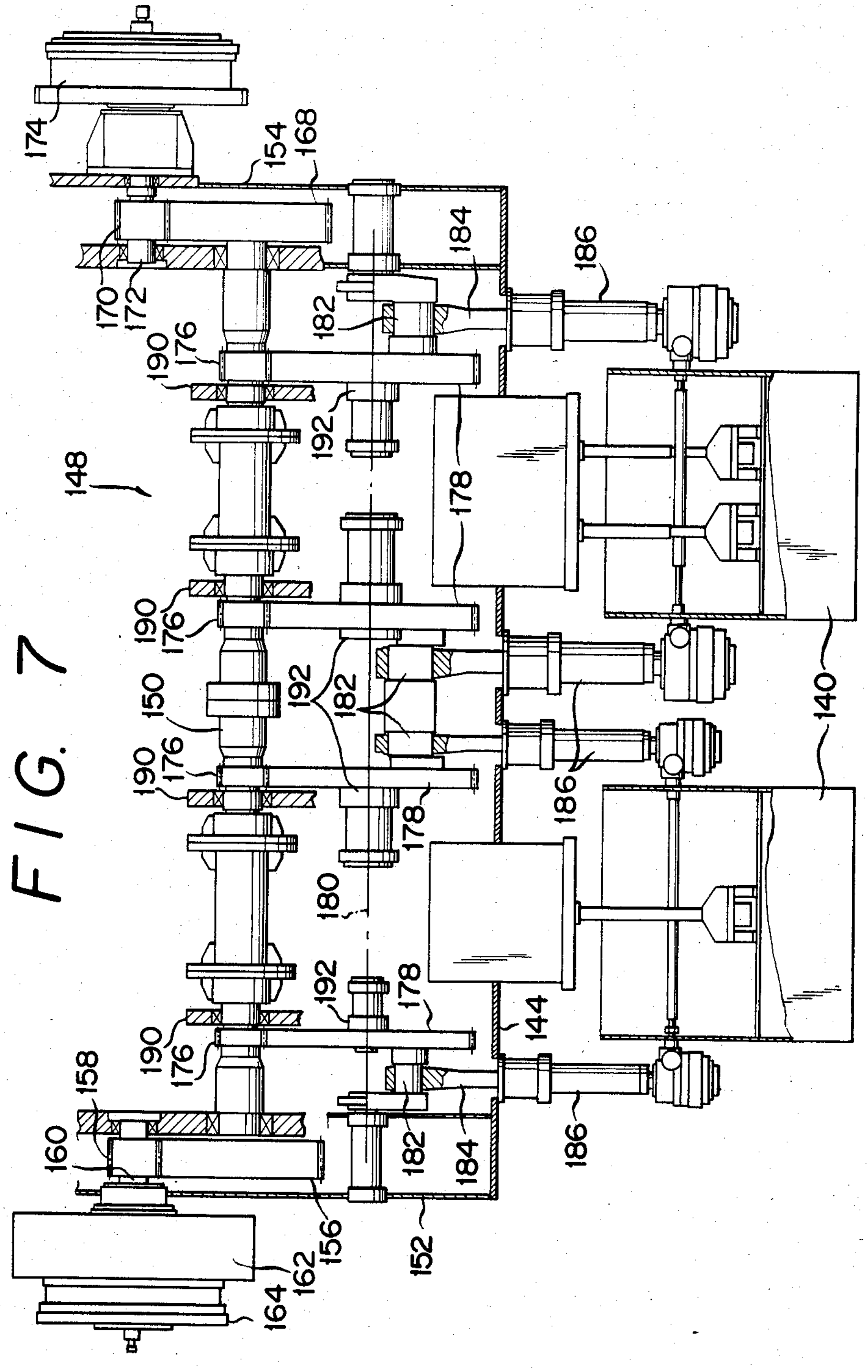
FIG. 7 is a developed sectional view of the dual crank press, taken along the line VII—VII of FIG. 6.

We have diagrammatically illustrated in FIG. 5 a dual crank preess to which the inventive concepts are also applicable. FIGS. 6 and 7 are more detailed representations of the same dual crank press. As will be noted from all these drawings, the drive mechanism 148 incorporated in the dual crank press comprises two pairs of main pinions 176 mounted in spaced positions on a common main shaft 150 within a drive housing 144, for driving two rams 140 arranged side by side thereunder. The main shaft 150 extends through, and is rotatably supported by, several bearing walls 190, FIG. 7, within the drive housing 144.

On one end of the main shaft 150, projecting into the left hand drive housing extension 152 as seen in FIGS. 5 and 7, a drive gear 156 is mounted for engagement with a drive pinion 158 on a drive shaft 160. The drive shaft has also mounted thereon a driving flywheel 162 having a clutch 164. The other end of the main shaft 150, projecting into the right hand drive housing extension 154, is coupled to a brake shaft 172 via gears 168 and 170. The brake shaft 172 is provided with a brake 174.

Within the drive housing 144 each main pinion 176 meshes with two main gears 178 which are mounted on crankshafts 192 arranged about fixed axes 180. Crankpins 182 projecting from the main gears 178 are operatively coupled to the two rams 140 via links 184 and connecting rods 186.

The other details of construction and operation of this dual crank press, and the advantages offered thereby, are substantially as set forth above in connection with the embodiment of FIGS. 3 and 4. It will be seen that while we have shown and described the press drive mechanism of our invention as adapted for crank presses, our invention finds applications in other types of mechanical presses.

We claim:

1. A drive mechanism for imparting up-and-down motion to a ram in a mechanical press wherein the ram is moved up and down relative to a bed, comprising:

(a) a drive housing immovably supported over the ram;

(b) a main shaft rotatably supported within said drive housing;

(c) a drive gear fixedly mounted on one end of said main shaft;

(d) a drive shaft rotatably supported in parallel relation to the main shaft;

(e) a drive pinion fixedly mounted on said drive shaft and meshing directly with said drive gear;

(f) a flywheel having a clutch and fixedly mounted on said drive shaft for imparting rotation to said main shaft via the intermeshing drive pinion and drive gear, the flywheel and clutch being disposed on one side of said drive housing;

(g) braking means disposed on the other side of said drive housing and acting on the other end of said main shaft, said braking means comprising a brake shaft rotatably mounted to said drive housing in parallel relation to said main shaft, gear means connecting said main shaft to said brake shaft, and a brake on said brake shaft;

(h) at least one pair of main pinions fixedly mounted on said main shaft intermediate its ends;

(i) at least one pair of main gears rotatable about a fixed axis within said drive housing and meshing with said pair of main pinions; and (j) means for translating the rotation of said main gears into said up-and-down motion of said ram, said translating means comprising eccentric means on said main gears, and means for operatively connecting said eccentric means to said ram.

* * * * *